INVENTOR.
OSCAR C. HEWETT
BY
Van Valkenburgh & Lowe
ATTORNEYS

May 13, 1969     O. C. HEWETT     3,444,034
SYNTHETIC RESIN STRUCTURAL PANEL AND METHOD OF MAKING THE SAME
Filed Feb. 1, 1965     Sheet 2 of 4

INVENTOR.
OSCAR C. HEWETT
BY
Van Valkenburgh + Lowe

ATTORNEYS

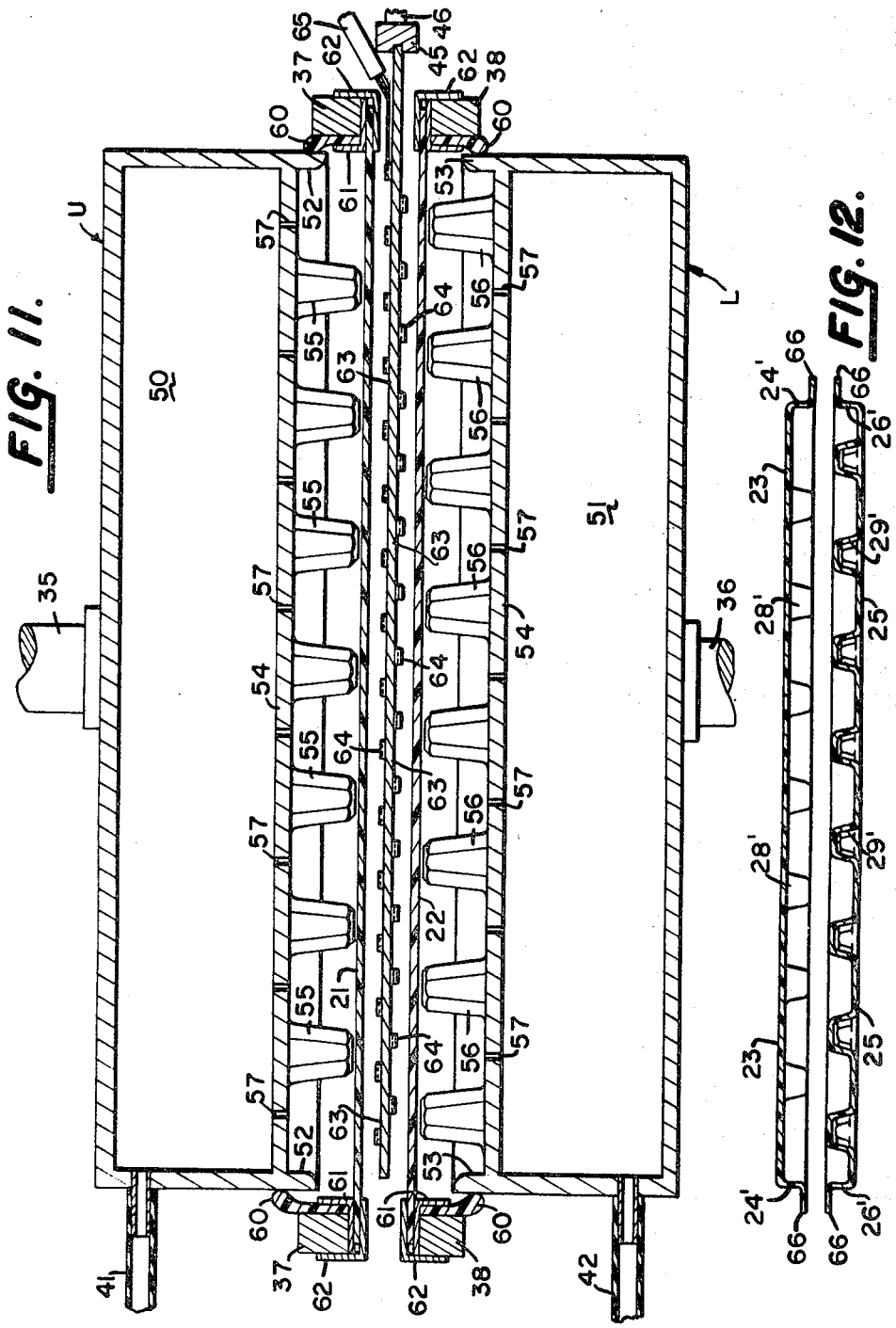

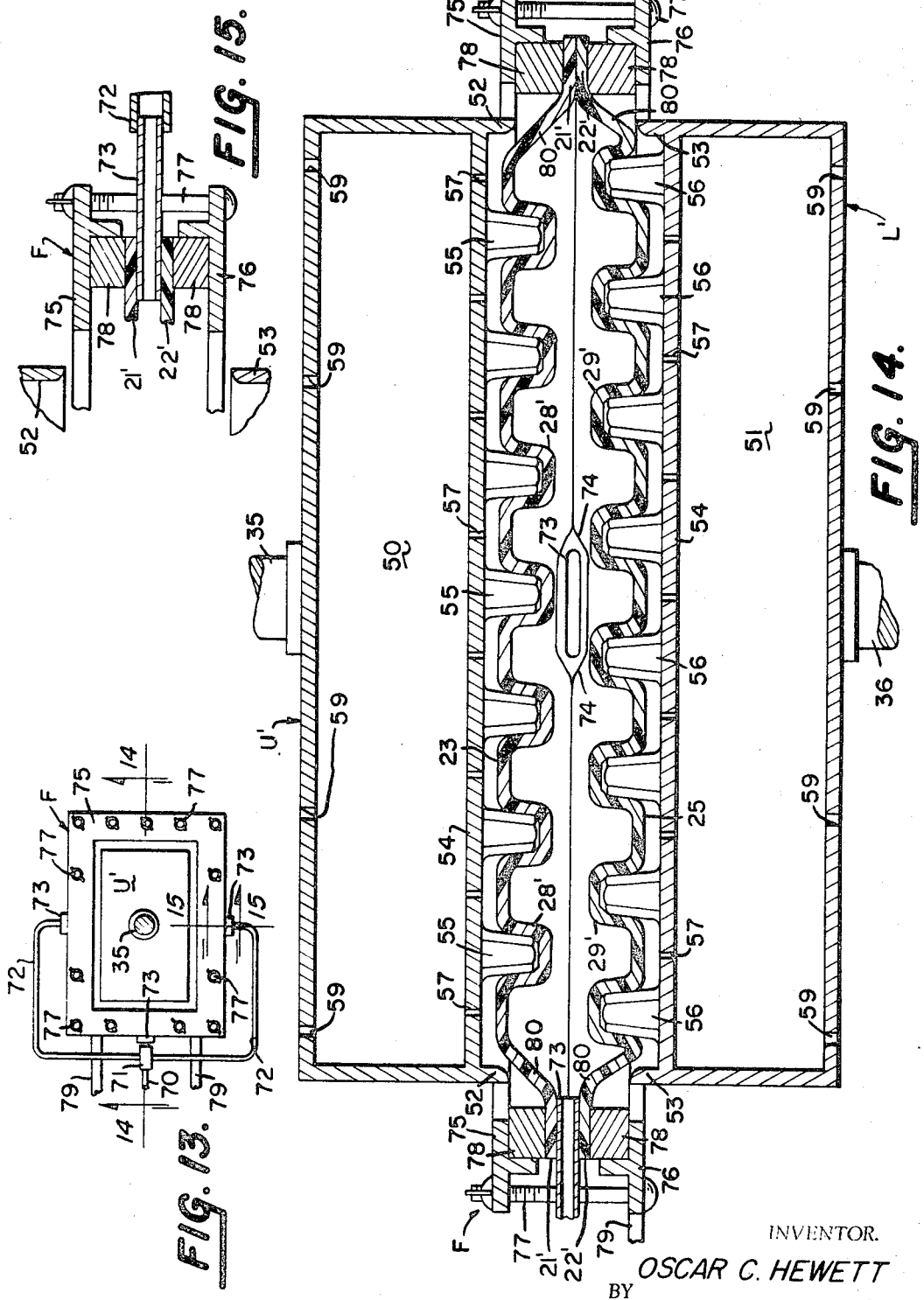

United States Patent Office 3,444,034
Patented May 13, 1969

3,444,034
SYNTHETIC RESIN STRUCTURAL PANEL AND METHOD OF MAKING THE SAME
Oscar C. Hewett, Denver, Colo., assignor, by mesne assignments, to Samsonite Corporation, Denver, Colo., a corporation of Colorado
Filed Feb. 1, 1965, Ser. No. 429,586
Int. Cl. B32b 3/02; B29c 17/04
U.S. Cl. 161—44                                8 Claims

ABSTRACT OF THE DISCLOSURE

A structurally rigid panel, comprising opposing, spaced synthetic resin sheet walls having inturned, interconnected peripheral rim portions enclosing an edge of the panel and an array of indrawn knobs extending from each wall to and fused to the inner face of the opposite wall, the array of knobs extending from one wall being a complementary array of the knobs extending from the other wall in alternating sequence thereto in two different directions. Each indrawn knob may be in the general form of a frusto-pyramid, while the array of knobs are preferably in uniformly spaced-apart rows and columns, with the knobs extending from one wall being at the center of the spaces of the knobs extending from the other wall. The process of forming the panels includes forming the knobs by differential air pressure and bringing the knobs against the opposite sheet, to heat weld the ends of the knobs to the opposite sheet. In addition, heat is applied to each sheet from between the sheets, while the sheets are being drawn into molds, which later produce the pressure for fusion or heat welding.

---

This invention relates to small, lightweight structural panels, and more particularly to lightweight structural panels formed of synthetic resin sheets and to methods for manufacturing the same.

Lightweight structural panels of the type herein considered are used for sundry purposes, one use being for the seats and backs of metal frame chairs. For such use, a panel is formed as a unitary member, generally rectangular in form, such as approximately 18 inches wide, 12 to 24 inches long and one-half to one-inch thick. The present invention comprises, in essence, a structural panel which is formed of two sheets only of selected synthetic resin material which are laced and interlocked together through an array of inwardly drawn knobs or dimples on each sheet; and, also, an improved method of and apparatus for manufacturing the same.

In the conventional construction of lightweight structural panels, a lightweight, low-strength core material is sandwiched between thin, strong surface sheets. The core holds the surface sheets apart and the surface sheets strengthen the panel against bending. However, such panels are often unsatisfactory for lack of adequate structural strength. The lightweight core material, such as resin foam, is usually deficient in compressive strength and unable to support any substantial loads placed upon it. Moreover, such a core material cannot bond tightly to the surface sheets to resist shear stresses imposed upon the material whenever the panel is loaded over a short span in a manner which produces both bending and shearing actions. Moreover, difficult problems arise in the manufacture of lightweight panels, because the outer sheets cannot be always effectively laminated to the core materials. To obviate such disadvantages, a lightweight panel has been proposed which eliminates the core structure, using two opposing surface sheets which are pocked with an array of indrawn knobs. Such knobs of one sheet abut the knobs of the other sheet and are connected together at the center plane of the panel, to present a waffle-like appearance.

The present invention is a further improvement over panels of this type, since it was found that such waffle-like panels were not efficient in resisting either shear stresses occurring across the knobs, as at the center of the panel or, in the alternative, were not efficient in resisting compression and tension strains at the outer surfaces, due to bending action. Whenever a sufficient number of indrawn knobs were provided to resist shear and direct compression loadings within the panel, the surfaces of the panel were disrupted by pocking the sheets to such an extent that the material remaining at the sheet surfaces was insufficient to resist the bending action of loads on the panel, whenever the panel was required to span an open gap. Also, in such construction, it was found that the knobs could not always be effectively welded together.

An object of this invention is to provide a novel and improved lightweight structural panel which may be formed of two sheets only of thermoplastic synthetic resin, completely eliminating a core therein.

Another object of the invention is to provide a novel and improved lightweight panel which may be easily designed to have a maximum strength and load-carrying ability for any given sheet thickness and size, and which will efficiently resist the specific and combined effects of compression, bending and shear actions when it is used for supporting various types of loads.

Another object of the invention is to provide a novel and improved lightweight panel which is especially adapted to be used as a structural member, such as in lightweight furniture, where it may be concealed, as by padding or other surface finishes, but which is also well adapted to be used for decorative purposes, such as, for example, light diffusing panels in windows and lighting systems, where the appearance of an interrupted surface is desirable.

Another object of the invention is to provide a novel and improved method for the manufacture of a lightweight structural panel of two resin sheets, wherein inwardly drawn knobs on each sheet are interlocked to the surface of the other sheet, by simple and effective heating, drawing and heat welding steps as the sheets are brought together.

Further objects of the invention are to provide a novel and improved lightweight structural panel and a simplified and improved method for manufacturing it; to provide such a panel which is a sturdy, rigid, neat appearing unit, capable of being manufactured by simple procedures at a low unit cost, with modified commonly available equipment, and capable of being effectively manufactured either on a mass production basis or on a custom basis.

With the foregoing and other objects in view, all of which more fully hereinafter appear, this invention consists of certain constructions, combinations and arrangement of parts and elements, and of certain steps, sequences and operations, all as will be hereinafter described, defined in the appended claims, and illustrated in preferred embodiment in the accompanying drawings, in which:

FIG. 11 is an enlarged, transverse vertical section, showing the components of the vacuum drawing and forming apparatus with resin sheets mounted therein and with the components positioned as at the commencement of the drawing step, before the resin sheets are drawn from a flat sheet form to the final panel form;

FIG. 12 is a diagrammatic, transverse vertical section of the resin sheets per se, showing the sheets as being partially drawn and spaced apart in a position which they will momentarily assume when in the vacuum drawing apparatus, before they are fully drawn and moved together;

FIG. 13 is a small scale, diagrammatic plan view of a portion of a modified pressure drawing apparatus;

FIG. 14 is a transverse, vertical section, on an enlarged scale, of components of the modified pressure drawing unit, taken along the indicated line 14—14 of FIG. 13, and showing the sheets as partially drawn; and FIG. 15 is a fragmentary, vertical section, taken along the indicated line 15—15 of FIG. 13, but on an enlarged scale, and showing the sheets prior to the drawing step.

The present invention contemplates a distinctive construction, which is a departure from the previous waffle-like pattern, in that an array of inwardly drawn knobs extend from each sheet to the surface of the opposite sheet and are welded thereto, with the arrays of knobs on the two sheets being in alternating sequences. For any given sheet thickness and panel size, the improved structure produces a much stronger panel. In the first place, the indrawn knobs were better able to resist direct loading or compressive action, having no structural discontinuities at the central plane of the panel. Also, only half the number of surface disruptions appear on each sheet for any given number of interconnecting knobs.

Figure 1:
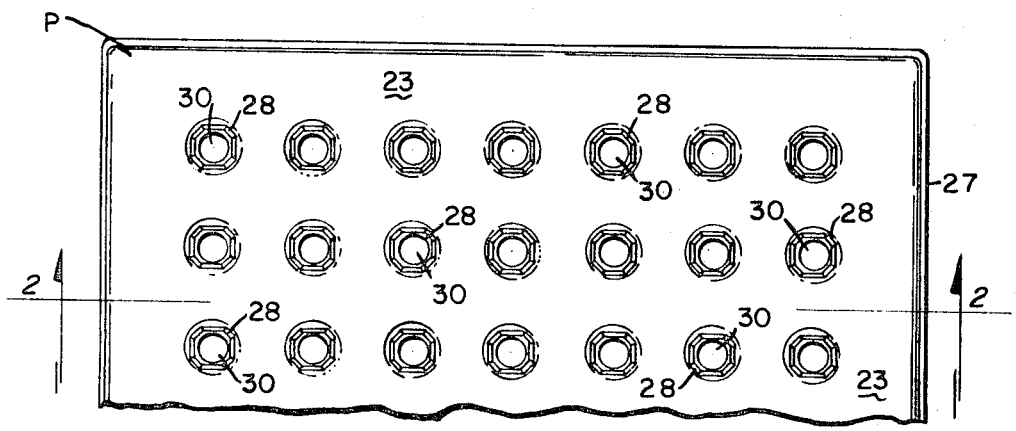
FIG. 1 is a top plan view of a portion of a lightweight panel construction according to the invention, with the remainder of the panel, identical in form to that shown, being broken away to conserve space.
Figure 2:
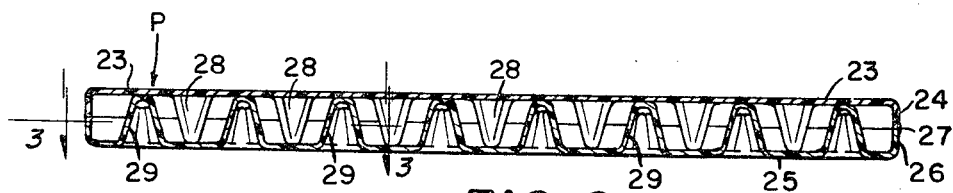
FIG. 2 is a vertical section, taken along the indicated line 2—2 of FIG. 1.

Referring more particularly to the drawings, FIGS. 1–5 illustrate an exemplary construction of the improved panel P, while FIGS. 6–15 illustrate apparatus for carrying out certain steps which are used in the manufacture of such a panel. The structural panel P may assume any shape, such as a rectangular shape, as illustrated in FIG. 1. The thickness of the panel is also optional, and it will be made sufficiently thick to resist loading, when it is mounted across an open span. As an example, the panel may be approximately 12 inches wide, 24 inches long and ¾-inch thick, but such dimensions may be varied considerably. Also, the panel is preferably formed as a flat member having the upper and lower surfaces lying in parallel planes, but it can be easily manufactured in any other suitable form, with the surfaces being dished or warped to any desired contour without altering its basic structure.

Figure 6:
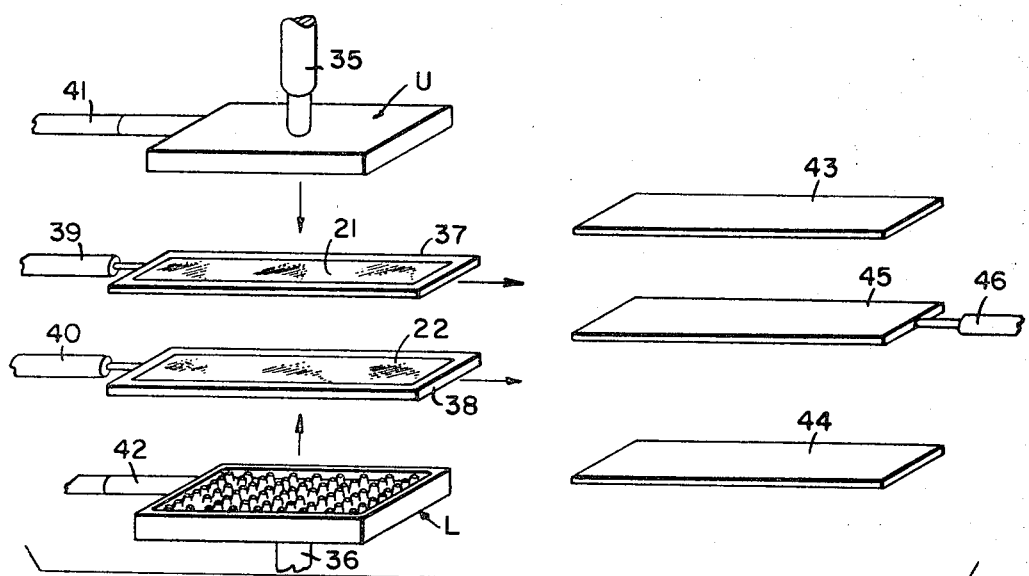
FIG. 6 is a diagrammatic cabinet view of the primary components of one arrangement of a vacuum drawing apparatus of this invention adapted to manufacture the improved lightweight panel, in carrying out the method of this invention, and showing also flat resin sheets mounted therein preliminary to a drawing operation.

The panel P is formed as two opposing complementary sections which, for the sake of convenience, may be referred to as an upper section formed from a flat resin sheet 21 of FIG. 6 and a lower section formed from a flat resin sheet 22 of FIG. 6, although the panel may assume any desired position in use. These two sections are identical to each other in many respects. The upper section is similar in form to an inverted shallow pan having a flat top wall or surface 23 bounded by a short, depending peripheral rim 24, while the lower section is similar in form to a shallow pan having a flat bottom wall or surface 25 and an upstanding peripheral rim 26. The rim 24 of the upper section abuts the rim 26 of the lower section at a welded joint 27, which defines the center plane of the panel as in a flashing, exaggerated in size as shown in FIG. 1 for clarity of illustration, to provide the enclosed box-like structure illustrated.

The opposing flat surfaces 23 and 25 are spaced apart at their edges by the peripheral rims 24 and 26 and aref urther held apart by an array of knobs 28 projecting downwardly from the surface 23 of the upper section and a similar array of knobs 29 projecting upwardly from the surface 24 of the lower section of the panel. In accordance with this invention, the array of knobs of one section are interspaced with the array of knobs of the other section, with each knob extending to a flat surface between knobs of the opposite section, and the end 30 of each knob, as in FIG. 5, being heat welded to the opposite section. Each knob 28 and 29 is formed as a cup-like indentation, the geometrical form of each knob being cylindrical or prismatic, but is preferably a truncated, regular pyramid whose apex is formed by the end 30 and whose base is at the surface 23 or 25 from whence the knob was drawn. The converging form of the truncated pyramid-shape is preferred, because it provides draft to permit easy removal of the section from a forming mold, as will be hereinafter described.

Figure 3:
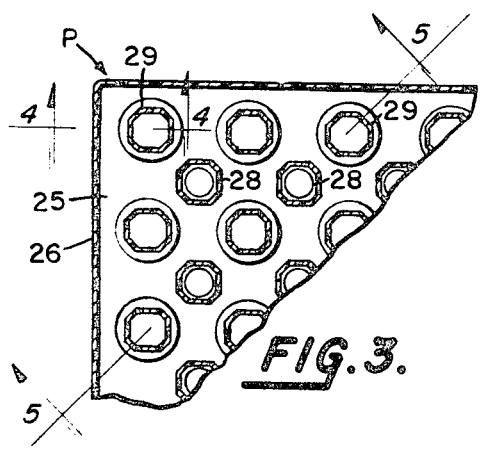
FIG. 3 is a fragmentary, horizontal section of a corner of the panel shown in FIG. 1 and taken along the indicated line 3—3 of FIG. 2.
Figure 4:
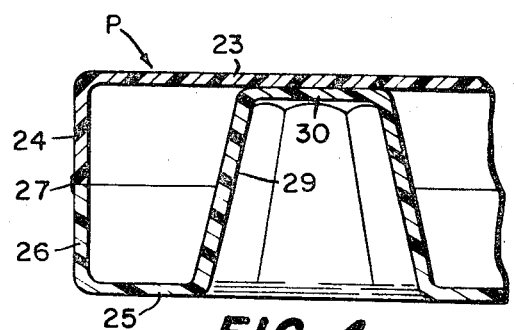
FIG. 4 is a fragmentary, sectional detail, taken along the indicated line 4—4 of FIG. 3, but on a greatly enlarged scale.
Figure 5:
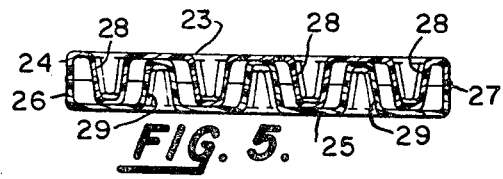
FIG. 5 is a diagonal, vertical section, taken substantially along the indicated line 5—5 of FIG. 3.

The knobs 28 are formed in surface 23 in any selected pattern over the surface, while the knobs 29 are preferably equally spaced between knobs 28, as in FIG. 3, in a complementary pattern, to provide a balanced dual array of knobs. A preferred spacing is to place the knobs in even rows and columns. For example, evenly spaced rows and columns of knobs 28 may be formed in the upper section, as illustrated in FIG. 1, to extend downwardly into the panel to contact the opposite surface. With this arrangement, the knobs 29 extending upwardly from the surface 25 of the lower section are positioned in like rows and columns, medially between the rows and columns of the upper section knobs 28, as in the manner illustrated in FIG. 3.

To complete this panel structure, as indicated above, the end 30 or apex portion of each knob drawn into the panel from surface 23 or 25, not only contacts the inner side of the opposing surface, but also is welded to that surface to stabilize and rigidify the panel against structural loading. It is contemplated that this lightweight structural panel will be subjected to several types of loading. For example, it must be able to withstand direct compression, as by a load placed upon it, and the knobs 28 and 29 resist this type of loading. Where the panel spans a gap, a load on the panel creates shearing and bending stresses. The bending stresses are resisted by the upper and lower surfaces 23 and 25, while the shearing action is resisted partly by the peripheral rims 24 and 26, but primarily by the knobs 28 and 29, particularly the welds at the ends 30 of the knobs. As will be evident, shearing action tends normally to sever the weld of the bottom 30 of each knob from the contacting surface sheet. Once a design loading is given, a panel may be designed with a proper sheet thickness and a proper number of knobs to withstand the design loading, such becoming a structural problem susceptible of solution. It is to be noted that each knob provides a discontinuity in one surface only of the panel and at the same time reinforces the surface of the opposing section between the knobs of that section against bending and buckling actions, so that the use of alternating complementary groups of knobs extending from both the upper and lower surfaces enhance the strength and rigidity of the final unit.

To facilitate the manufacture of the panel P by forming the sections and joining them together, it is desirable to make the sections of a thermoplastic type of synthetic resin sheet material, which is capable of being drawn and formed by vacuum or pressure drawing operations, as well as being heat welded. A common type of synthetic resin suitable for this purpose is a polystyrene copolymer known as "high-impact styrene," but a number of other resins also exist which are suitable for the purpose, such as the acrylonitrile butadiene styrene copolymer known as ABS, polypropylene, polyethylene, nylon and the like. The forming of sheets 21 and 22 of FIG. 6 into a panel P by drawing operations, may be accomplished with conventional vacuum or pressure drawing apparatus, modified in accordance with this invention to permit the simultaneous drawing of the two resin sheets ultimately forming the panel P in a simplified, efficient sequence, as will now be described.

The sequence of vacuum drawing operations, with such modified apparatus, is illustrated schematically in FIGS. 6 through 10 and a portion of the modified vacuum drawing apparatus is illustrated in FIG. 11. Such apparatus includes an upper mold U and a lower mold L which are ordinarily oriented horizontally to be moved along a vertical axis, as by posts 35 and 36, respectively, from an initial position where they are separated, as in FIG. 6, to a final position where they come together in registration, as in FIG. 1. The resin sheets 21 and 22 are mounted in horizontally disposed frames 37 and 38, respectively, which are supported one above the other by respective arms 39 and 40, between the molds U and L, and are also adapted to be moved vertically, from an initially separated position to final joining position when the panel is formed by the molds. Molds U and L are preferably vacuum molds, being provided with vacuum connections 41 and 42, respectively, such as hoses, for this purpose.

Figure 7:
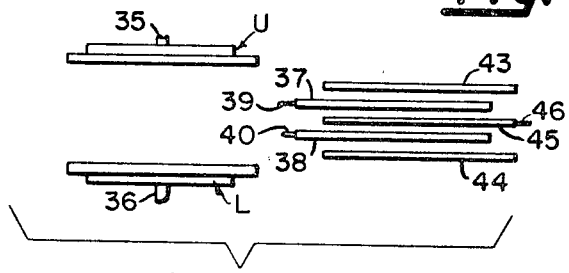
FIGS. 7 through 10 are diagrammatic, end views of the components illustrated in FIG. 6, showing, in sequential steps, the positions the components will assume during the heating and drawing operations required to manufacture the panel from the resin sheets within the apparatus.

The frames 37 and 38 are also adapted to be shifted horizontally, out of alignment with the molds, as in FIG. 6, and between fixed upper and lower electric heaters 43 and 44, as in FIG. 7, normally located at one side of the molds. A modified type of oven may be substituted for electric heaters 43 and 44, or any other suitable type of fixed heater or heating surface, such as radiant or infrared heating lamps, may be utilized. An intermediate, shiftable, preferably electric heater 45, supported by an arm 46, is disposed between the frames 37 and 38 when they are moved between heaters 43 and 44, as in FIG. 7. Heater 45 is adapted to be moved with the frames 37 and 38 when the latter return to alignment between the molds, as in FIG. 8. In the initial heating step, as in FIG. 7, both the upper and lower surface of each sheet 21 and 22 is heated by heaters 43, 44 and 45, with heating by heater 45 being continued as the frames 37 and 38 and heater 45 are moved between the molds, as in FIG. 8. As in FIG. 9, the molds U and L are moved downwardly and upwardly, respectively, for vacuum drawing each sheet, with heating being continued by heater 45, so that the ends 30 of the knobs, as well as the edges which will form the welded joint 27, will be heated to a welding temperature, as the heater 45 is being withdrawn during vacuum drawing. Then, the upper and lower molds are brought together to complete the welding.

Figure 9:
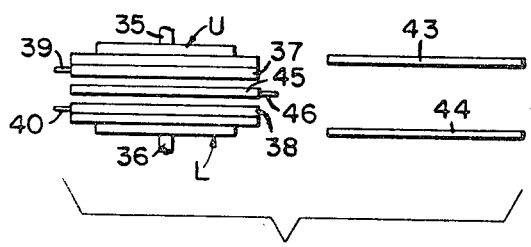
Figure 10:
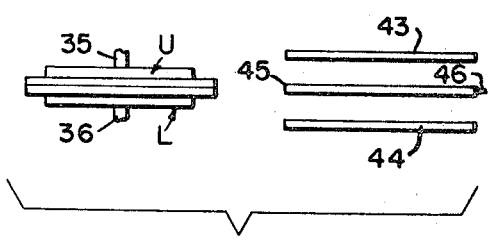

FIG. 11 is illustrative of the apparatus in further detail, with the components being in the position of FIG. 9, i.e. when drawing is about to commence. Each mold U and L is similar but complementary in construction, having a space 50 or 51 with which a vacuum line 41 or 42 communicates and a rectangular depending flange 52 and upstanding flange 53, respectively, which close together to weld the edges of rims 24 and 26 at joint 27, the periphery of flanges 52 and 53 being conveniently rounded on the inside, and provided with a cutting edge on the outside, as shown. Each mold includes a flat base 54 which forms the upper and lower surfaces 23 and 25 of the finished panel and from which a proper arrangement of arrays of male stubs 55 and 56, respectively, extend toward the opposite mold to form the inward knobs 28 and 29 of the finished panel. It is to be noted that the stubs 54 and 55 extend beyond the edges of the respective flanges 52 and 53 a distance sufficient to draw the knobs 28 and 29 to the opposing surface sheet of the panel, while the edges of flanges 52 and 53 draw a corresponding portion of the rims 24 and 26 to the center plane of the panel. To complete the unit, holes 57 extend through each base 54, interspaced with knobs 55 and 56, to the interior of the mold cavity to permit vacuum action to be applied to the cavity between the molds.

The upper and lower sheet frames 37 and 38 are opposing but similar, each including a rectangular body which is larger than the corresponding mold, with a seal 60 attached to the inside of each frame 37 or 38, as by a fastening strip 61, and extends about each body portion and is directed towards the corresponding mold for contact with the outer surface of the mold, when the parts are in position for the commencement of drawing, to thereby enclose the cavity between the molds and permit the vacuum effect to take place. The corresponding resin sheet 21 or 22 is held stretched across each frame and is held in position by suitable clamping means, such as removable, angular clamps 62, which may be split and provided with conventional operating handles and levers (not shown) for readily clamping a sheet 21 or 22 in position and releasing the scrap outer peripheral edges of the sheets, after severance by flanges 52 and 53. Heater 45, preferably an electric resistance heater, may include a plate 63 formed of insulating material about which an electric heating element 64 is wound in conventional fashion, with current supplied through a lead 65.

The operation of heating, prior to drawing, a sheet of synthetic resin within its frame 37 or 38, is preferably accomplished by a radiant heating action within an oven or between other suitable heating surfaces or heaters 43, 44 and 45, and a skilled artisan can very quickly tell when a resin sheet has come to a drawing temperature by the appearance of the sheet tiself. The sheet is initially flat and rigid. As heating commences, the resin sheet commences to sag and loosen considerably and then, as it approaches the drawing temperature, shrinks and becomes taut. This occurs at a temperature a few degrees below the softening point temperature of the resin and at a temperature slightly below the welding temperature of the resin. Of course, when electric resistance heaters are utilized, the time of heat application may be controlled by an automatic timer, which is also connected to cause frames 37 and 38 and heater 45 to move between the molds at the expiration of the initial heating period.

Figure 8:
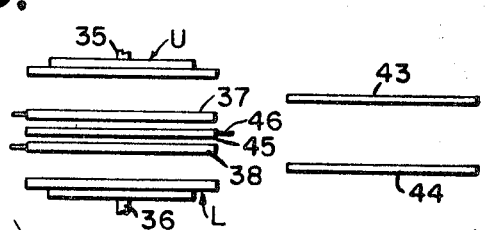

When the drawing temperature is reached, indicated by the taut condition of the resin sheet or the timer, the frames 37 and 38 are moved from the oven or from between heaters 43 and 44 to the initial drawing position between molds U and L. The molds are then moved toward each other and within seals 60, then stopped as stubs 55 and 56 reach the respective heated resin sheets 21 and 22, while the vacuum may be turned on as soon as they engage seals 60 or shortly before. At the same time, the intermediate heater 45 is moved between the molds, with frames 37 and 38, as illustrated in FIGS. 8, 9 and 11. As indicated, the intermediate heater provides a supplementary heating action, which may be timed to bring the inner surfaces of the resin sheets to a temperature which facilitates a more effective welding action of the knob ends 30 to the inner sides of the panel surfaces 23 and 25, and of the two rims 24 and 26 of the panel.

This intermediate heater 45 may remain in position as the drawing action commences, as in FIG. 9, and in position between the resin sheets until they are partially drawn, as illustrated in FIG. 12, which shows the sheet portions 24' and 26' which will form the rims 24 and 26, as partially shifted rims, and partialy drawn knobs 28' and 29'. In such position, the intermediate heater 45 acts especially upon the knob ends 30 to effectively hold their temperature at or to a welding temperature, for effective ultimate joining together of the panel sections. It will be noted that a portion of the lateral flanges 66 of the sheets will be drawn into the molds during the rest of the drawing operation, but that the remainder of flanges 66 will be severed and stay with frames 37 and 38 when the panel P is finally formed.

Before final drawing and joining of the resin sheets, the intermediate heater 45 is returned to the position of FIG. 6, and the molds move further together. As the molds move together, the knob ends 30 will be pressed by the ends of stubs 55 and 56 against and welded or fused to the opposing sheet surfaces, while the edge joint 27 will be formed by the resin sheets being pressed together and severed on the outside by flanges 52 and 53. The mold flanges 52 and 53 may be suitably formed also to cut away any flashing remaining, after the panel P is formed. However, this flashing may also be cut away in a subsequent operation, not herein illustrated, or may merely be left in place.

In FIGS. 13 to 15 is illustrated a pressure drawing apparatus which may be used for the formation of the panel P. This apparatus includes an upper mold U' and lower mold L' substantially the same as those heretofore described, thus having supporting posts 35 and 36, spaces 50 and 51, flanges 52 and 53 and stubs 55 and 56, each respectively, but having a plurality of vents 69 instead of a vacuum line, as heretofore described.

A single pressure draw frame F is used, which is disposed between the upper and lower molds during drawing and which is adapted to be moved into and out of an oven or between a pair of electric heaters, as hereinbefore described, it being noted that the intermediate heater is not used. As in FIG. 13, a pressure line 70, as for compressed air which is preferably heated, is connected to a cross 71 at one end of the frame from which a pipe 72 leads to each side of the frame, the cross and each pipe 72 being connected to a flat nozzle 73, the sides 74 of which converge laterally in an acute angle, as in FIG. 14, for a purpose to be described. As in FIGS. 13–15, the pressure draw frame F is formed by two rectangular opposing body members 75 and 76, each of which is T-shaped in section to provide outward flanges for receiving removable connecting bolts 77 and inward flanges for holding rectangular, peripheral sheet retaining clamps 78 on each side of a pair of resin sheets 21' and 22', which are placed together between the sheet retaining clamps. The acutely angled sides 74 of the nozzles 73 permit the sheets to be clamped without a gap at each side of a nozzle. A suitable arm or pair of arms 79 are adapted to support frame F and move it horizontally between a position between the upper and lower molds and an oven or between electric heaters for heating the resin sheets preliminary to drawing them. During heating, sufficient pressure is supplied through air line 70 to keep the resin sheets slightly apart, to prevent them from adhering together during heating. After heating, drawing will occur in substantially the same manner heretofore described, by movement of the frame to its initial position between the molds, which are initially spaced apart, as in FIG. 14, to clear frame F, then movement of the molds toward each other into a position in which the ends of stubs 55 and 56 will contact the sheets, while at the same time additional compressed air is supplied between the resin sheets, to provide sufficient force to push the sheets against the stubs 55 and 56 and the surfaces of base 54 of each mold cavity, as into and past the position of the sheets illustrated in FIG. 14, in which knobs 28' and 29' are partially formed knobs and outer portions 80 of the sheets are still spaced slightly from flanges 52 and 53. During the application of air between the sheets during forming, air originally in the mold cavity will be expressed through holes 57 into spaces 50 and 51, thence out through vents 59. The final step, to form the finished panel, will occur by moving together the upper and lower molds with sufficient pressure to weld the ends 30 of knobs 28 and 29 to the opposing inner surface and to weld the peripheral rims 24 and 26 together. This final action, i.e. actually compressing the members together, is preferably accomplished with a moderate degree of compressed air within the panel P, since it was found that when the air within this type of panel was supplied at a moderate pressure during the final movement, the final panel tended to be more rigid.

It will be understood, of course, that other constructions of the apparatus may be used in carrying out the steps of the method of this invention. For instance, the base 54 of each mold may be heated, as by an electric resistance heater installed in each mold, as for supplying additional heat to the molds U' and L' of FIGS. 13–15, to raise the temperature of the plastic sheets as they contact the molds and provide additional heat for welding, since the greater fluidity of the sheet at welding temperature is restrained by contact with the molds. If desired, the molds U' and L' of FIGS. 13–15 may each be provided with a vacuum connection, so that the molding step may be accomplished through the use of both pressure and vacuum, in combination.

What I claim is:

1. A structurally rigid panel, comprising opposing, spaced synthetic resin sheet walls having inturned, interconnected peripheral rim portions enclosing an edge of said panel and an array of indrawn knobs extending from each wall to and fused to the inner face of the opposite wall, the array of knobs extending from one wall being a complementary array of the knobs extending from the other wall in alternating sequence thereto in two different directions.

2. In the panel defined in claim 1, wherein said sheet walls are disposed in parallel planes.

3. In the panel defined in claim 1, wherein each indrawn knob is in the general form of a frusto-pyramid having the apex portion thereof forming a flat end attached to the inner surface of the opposite sheet wall.

4. In the panel defined in claim 1, where each array of knobs is in uniformly spaced-apart rows and columns, and the knobs extending from one wall lie at the center of the spaces between the knobs extending from the other wall.

5. In a method for forming a rigid panel having opposing, spaced sheet walls having inturned interconnected peripheral rim portions enclosing an edge of said panel and an array of indrawn knobs extending from each wall to and joined to the inner face of the opposite wall, the array of knobs extending from one wall being a complementary array of the knobs extending from the other wall and in alternating sequence thereto in two different directions, wherein said sheet walls are formed of heat weldable, thermoplastic synthetic resin-like material, said method including the steps of:

(a) disposing a pair of sheets apart in substantial spaced parallelism;
(b) heating said sheets to a drawing temperature;
(c) forming by applying differential air pressure, the indrawn knobs and rim portions from each sheet surface; and
(d) bringing the portions together with the ends of the indrawn knobs moved against the inner surface of the opposite sheet and the rim edge portions against each other with sufficient pressure to heat weld the respective components together.

6. In the method set forth in claim 5, wherein heat is continued to be applied to the resin sheets between the sheets as drawing is commenced.

7. In the method set forth in claim 6, wherein said sheets are formed by pulling each into a mold by a suction effect.

8. In the method set forth in claim 7, wherein heat is applied to each sheet from between said sheets, during heating of said sheets while being drawn into said molds.

References Cited

UNITED STATES PATENTS

| | | | |
|---|---|---|---|
| 363,353 | 5/1887 | Baker | 161—130 XR |
| 3,086,899 | 4/1963 | Smith et al. | |
| 3,142,599 | 7/1964 | Chavannes | 156—210 |

FOREIGN PATENTS 936,088   9/1963   Great Britain.

ROBERT F. BURNETT, *Primary Examiner.*

W. A. POWELL, *Assistant Examiner.*

U.S. Cl. X.R.

18—19, 35; 156—156, 196, 267, 272, 285, 306, 382; 161—127, 130, 149; 264—92, 101, 163